UNITED STATES PATENT OFFICE.

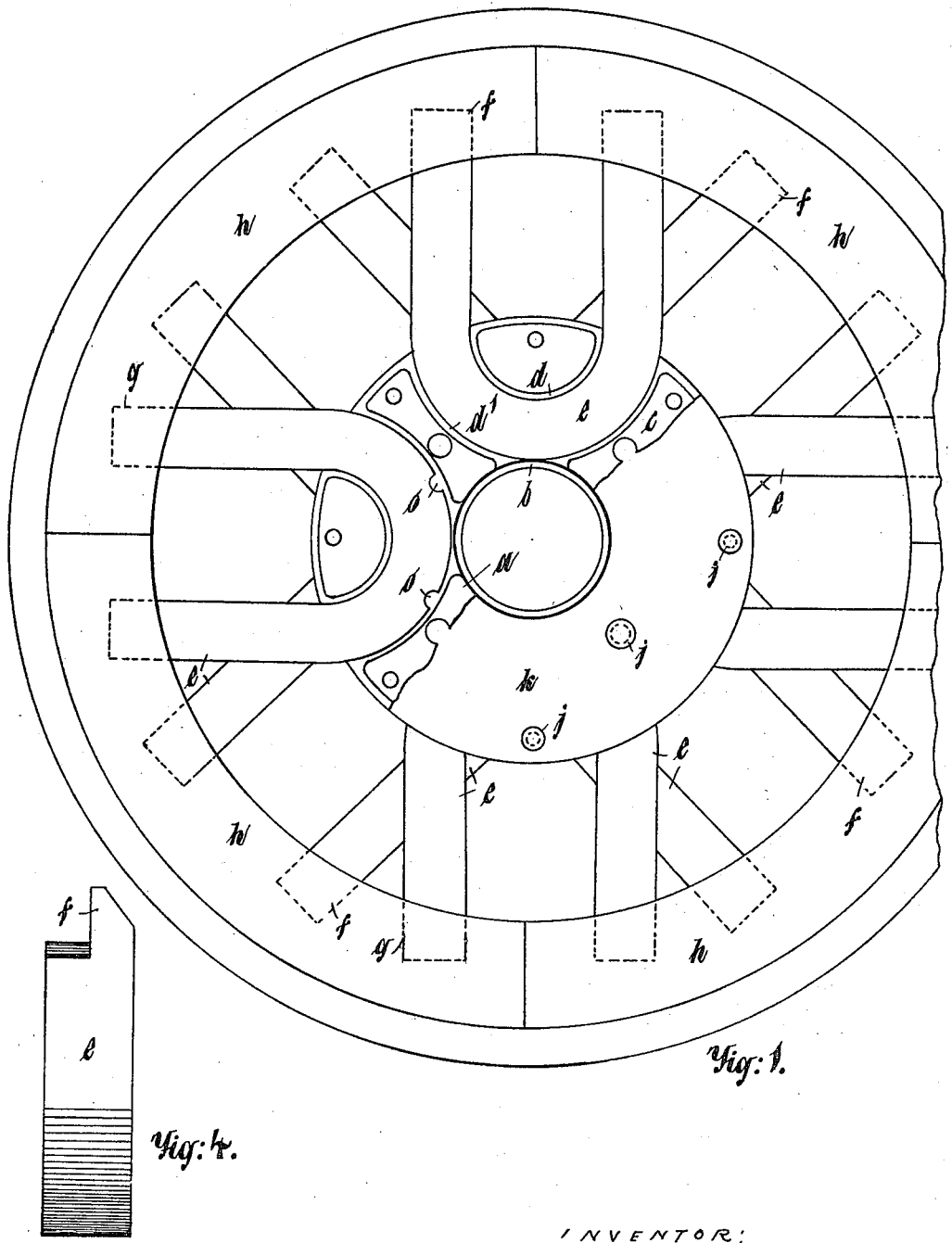

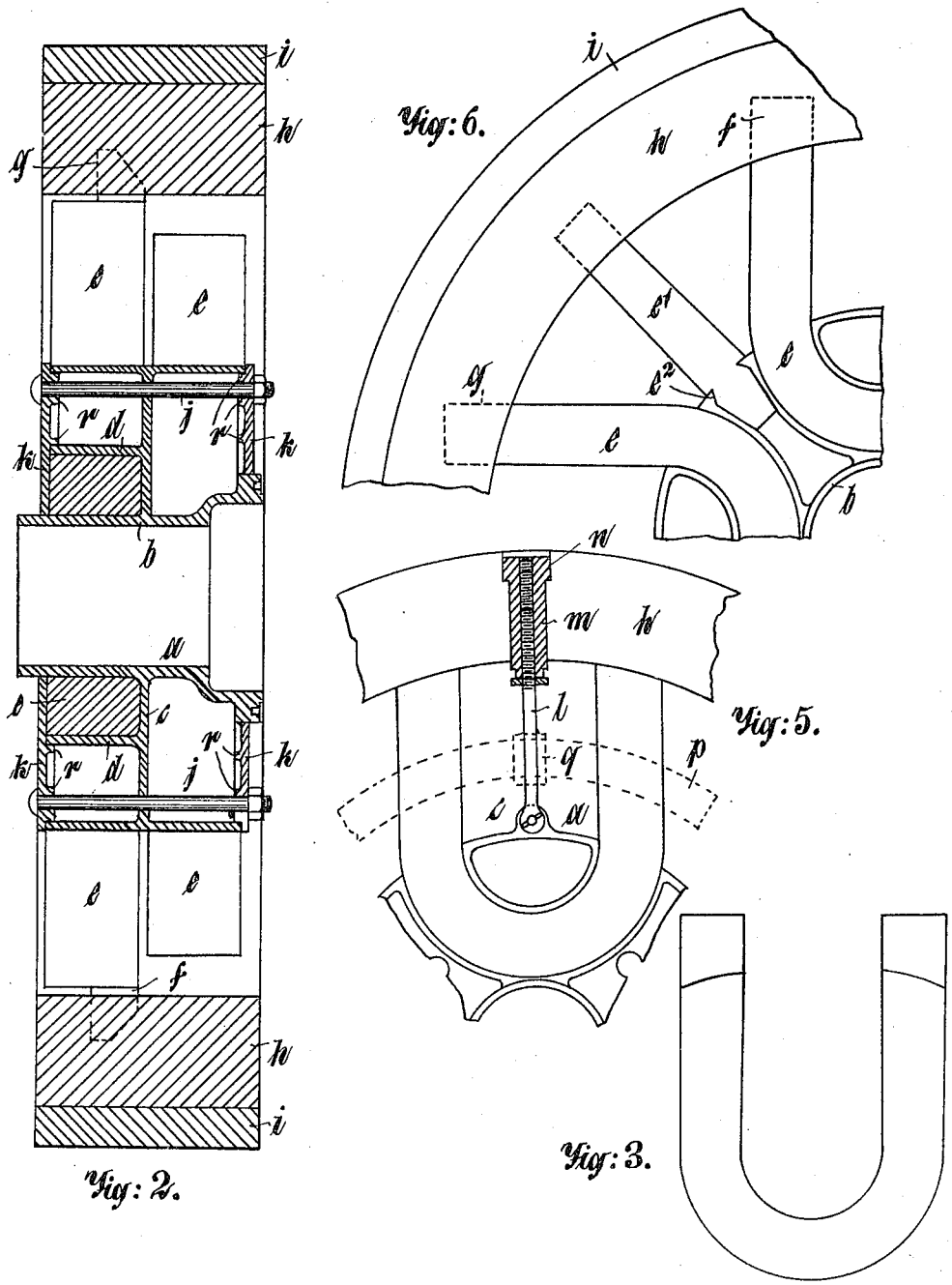

THOMAS DANIEL STAGG, OF LONDON, ENGLAND.

WHEEL OF VEHICLES, DRIVING-PULLEYS, AND THE LIKE.

1,311,537.  Specification of Letters Patent.  Patented July 29, 1919.

Application filed July 16, 1918. Serial No. 245,246.

*To all whom it may concern:*

Be it known that I, THOMAS DANIEL STAGG, subject of the King of Great Britain and Ireland, residing at Villa Rustica, Herne Hill, London, S. E., England, have invented new and useful Improvements in and Relating to the Wheels of Vehicles, Driving-Pulleys, and the like, of which the following is a specification.

My invention relates to wheels for vehicles, driving pulleys and the like and has for its object the construction of such devices whereby greater strength, greater durability, simpler construction and ease of repair can be obtained compared with known devices.

According to this invention the nave or hub of the wheel has formed on its face or on both faces a series of semi-circular recesses the walls of which extend laterally more or less in the same direction as the axis. Into each recess is disposed a spoke of U formation the outer ends of which engage with the felly of the wheel. The walls of the recess and the portion of the spoke engaging therewith may be of slightly tapered formation in order to insure a tight fit. The spokes are kept in place by side plates or flanges and by bolts or other convenient fastening means passing through the side plates and the hub so as to hold the spokes firmly in the recesses in the hub. The spokes on one side of the wheel are preferably disposed intermediate of the spokes on the other side of the wheel so that the inner edge of each spoke lies adjacent to a plane passing through the center of the wheel.

The felly of the wheel is provided with a tire of any suitable construction. In order to provide means other than the tire for binding the parts of the wheel together a circular ring formed in segments with connecting pieces is passed through the center portion of the spokes, and tightening bolts are attached to the ring and pass up through the felly; the nuts on the outside thereof when tightened down draw the felly toward the center of the wheel. Or equivalently the tightening bolts may be attached to a flange on the hub.

If necessary bolts may be arranged through the spokes, side plates and the hub in order to assist in taking the driving effort.

It will be recognized that in this construction a very large embedding surface is provided on the spokes at their inner end where they abut against the hub in order to take the pressure inward in a radial direction.

In order that the invention may be the better understood I will now proceed to describe the same in relation to the accompanying drawing, reference being had to the letters and figures marked thereon. Like letters refer to like parts in the various figures, in which:—

Figure 1 is a side view of a wheel with two sets of spokes constructed in accordance with this invention, one side plate being broken away to show two spokes in their recesses.

Fig. 2 is a transverse section of the same.

Fig. 3 is a side view of one of the spokes.

Fig. 4 is a view of same at right angles to that in Fig. 3.

Fig. 5 is a view showing the felly attached to the hub by tension bolts.

Fig. 6 is a part view of a wheel with one set of spokes constructed according to the invention with a set of intermediate ordinary spokes.

In Figs. 1 and 2 the hub $a$ has a central boss $b$ and a centrally disposed flange $c$ thereon. On each face of the flange $c$ are disposed walls $d$ $d'$ of semi circular formation extending outward and arranged to form recesses into which the spokes $e$ of wood or other equivalently resilient material are forced under pressure. The walls $d$ $d'$ are placed slightly oblique to one another so as to make the recess slightly taper to insure the spoke $e$ being jammed tightly therein. Each spoke $e$ is of U shape made preferably of wood bent from the straight under heat so that the fibers of the wood run parallel to the sides of the spoke $e$. At each outer end of the spoke $e$ is formed a tenon $f$ which is inserted into a hole $g$ in the felly $h$, the tenon $f$ being cutaway at one side as shown in Fig. 4 to enable the tenon $f$ to be inserted into its hole $g$. The felly $h$ is preferably made of wood in sections and when all the sections of the felly $h$ and the spokes $e$ are engaged with one another and the circular part of the spokes have been forced into the recesses on the hub $a$ the whole structure is consolidated by a bonding tire $i$ forced or shrunk on to the felly $h$.

On each side of the hub $a$ is arranged a side plate $k$ and through the plates $k$ and the hub $a$ are a series of bolts $j$ which hold the spokes e in their recesses and consolidate the hub portion of the wheel. The bolts j preferably pass through the body of the spokes e to prevent them moving in the recesses in a circular direction, or equivalently other locking means may be provided. For example ribs o may be formed on the wall d' to engage channels across the spoke or the spokes may be formed in two parts, the division being preferably made in the center of the curved portion and a transverse wall may be provided across the recess against which the ends of the curved portion can abut. Any driving or retarding action on the spokes is exerted in a tangential direction from the hub to the felly or vice versa. The plates k are furnished on their inner faces with projecting fences r which fit into and engage the walls d and d' so that the strains transmitted by the bolts j are uniformly distributed to the hub a.

In Fig. 5 the sections of the felly h are anchored to the hub a by screwed tension rods l coupled to the flange c at one end and engaging nuts m at the other end, the nuts being disposed in recesses n in the felly so that when the nuts are screw-down the tension rods they draw the sections of the felly h together to make them firmly abut against one another. Instead of utilizing the flange c a ring p can be disposed between the two sets of spokes e to which ring the hooked end q, shown in dotted lines, of the rod l can be engaged so as to be anchored thereto.

In Fig. 6 a part wheel is shown having only one set of spokes e constructed and fixed in accordance with this invention and in addition thereto an ordinary spoke e' is mounted in a pocket e² in the hub a between each pair of spokes e to support the felly h and form increased driving means when the wheel is used for driving or braking purposes.

I claim:—

1. A wheel structure of the compression spoke type consisting of a hub element having a series of curved recesses arranged around same, a series of spoke elements of wood of substantially U shape firmly inserted into said recesses, a felly into which the outer ends of the spokes are engaged, recesses in said felly for receiving the outer ends of said spokes lateral supporting means for holding said spokes in the recesses in the hub element and bonding means disposed about said felly for forcing the felly against the ends of the spokes and the curved portion of the spokes into the hub recesses and thus consolidating the whole structure, substantially as described.

2. A wheel structure of the compression spoke type consisting of a hub element having a series of curved recesses arranged around same, a series of spoke elements of wood of substantially U-shape firmly inserted into said recesses, a felly into which the outer ends of the spokes are engaged, recesses in said felly for receiving the outer ends of said spokes, lateral supporting means for holding said spokes in the recesses in the hub element, bonding means disposed about said felly for forcing the felly against the ends of the spokes and the curved portion of the spokes into the hub recesses and thus consolidating the whole structure, and locking means between said spokes and the hub, said locking means being transversely disposed relative to the plane of the spokes.

3. A wheel structure of the compression spoke type consisting of a hub element having a series of curved recesses arranged around same, a series of spoke elements of wood of substantially U-shape firmly inserted into said recesses, a felly into which the outer ends of the spokes are engaged, recesses in said felly for receiving the outer ends of said spokes, lateral supporting means for holding said spokes in the recesses in the hub element, bonding means disposed about said felly for forcing the felly against the ends of the spokes and the curved portion of the spokes into the hub recesses and thus consolidating the whole structure, and a plate for holding the spokes in place in the hub adapted to interlock with said hub so as to transmit the driving and braking effort through same uniformly around said hub.

In testimony whereof I have signed my name to this specification in the presence of two subscribing witnesses.

THOMAS DANIEL STAGG.

Witnesses:
WALTER CARROLL,
DORIS HITCHCOCK.

Copies of this patent may be obtained for five cents each, by addressing the "Commissioner of Patents Washington, D. C."